United States Patent [19]
Eno et al.

[11] Patent Number: 5,809,532
[45] Date of Patent: Sep. 15, 1998

[54] DATA PROCESSOR WITH CACHE AND METHOD OF OPERATION

[75] Inventors: James P. Eno, Pflugerville; Sonya E. Gary, Austin, both of Tex.

[73] Assignee: Motorola Inc., Schaumburg, Ill.

[21] Appl. No.: 850,368

[22] Filed: May 2, 1997

Related U.S. Application Data

[63] Continuation of Ser. No. 161,365, Dec. 6, 1993, abandoned.
[51] Int. Cl.⁶ .................................................. G06F 12/00
[52] U.S. Cl. ........................ 711/141; 711/144; 711/145; 711/146; 395/750.05; 395/750.06
[58] Field of Search ................................. 395/403, 440, 395/468, 473, 412, 416, 293, 750.04, 750.05, 750.06; 711/3, 113, 141, 144, 145, 146

[56] References Cited

U.S. PATENT DOCUMENTS

| | | |
|---|---|---|
| 5,119,485 | 6/1992 | Ledbetter, Jr. et al. ................ 395/473 |
| 5,440,747 | 8/1995 | Kiuchi ....................................... 395/375 |
| 5,555,382 | 9/1996 | Thaller et al. ........................... 395/293 |
| 5,557,769 | 9/1996 | Bailey et al. ............................ 395/473 |
| 5,603,037 | 2/1997 | Aybay .................................. 395/750.04 |
| 5,623,629 | 4/1997 | Suzuki et al. ............................ 395/468 |

*Primary Examiner*—Eddie P. Chan
*Assistant Examiner*—Than Nguyen

[57] ABSTRACT

A data processor (10) has a data cache (16) that supports snooping operations and conserves power. A freeze logic unit (46) enables the data cache when the data cache performs a load/store operation from an execution unit (24) or when it detects a snoop operation. However, the freeze logic unit disables all clock regenerators (44) coupled to the data cache while the data cache waits for data to be returned to it from a common memory system after a data "miss."

14 Claims, 4 Drawing Sheets ated 5,809,532

DATA PROCESSOR WITH CACHE AND METHOD OF OPERATION

This application is a continuation of prior patent application Ser. No. 08/161,365 filed Dec. 6, 1993 now abandoned.

FIELD OF THE INVENTION

The present invention generally relates to digital computing systems, and more specifically to a data processor with snooping abilities and a cache.

BACKGROUND OF THE INVENTION

In many data processor applications, power consumption is critical to product success. The ability of a data processor to conserve power when idle, can extend the useful life of the relevant system in the short term and in the long term. This ability is especially critical when the system is powered by a battery or is thermally sensitive. In the first case, a battery powered system able to conserve power can operate longer between battery chargings. This ability periodically increases the usefulness of the system to the user by extending the time between battery chargings or, conversely, reduces the size and weight of the required battery. In the second case, a thermally sensitive system can reduce its heat generation and thus thermal stresses by reducing its power consumption. This ability increases the reliability of the system and ultimately extends its lifetime.

It is well known in the art to conserve power in a data processor by disabling the circuit or circuits, "clock regenerators," which distribute the system clocking signal. This methodology reduces power consumption by forcing the data processor's transistor logic to a steady state. Clocked complementary metal oxide semiconductors ("CMOS") consume essentially no power in the steady state. Unclocked CMOS circuits consume no power when their inputs do not change state. The inputs to unclocked CMOS circuits do not change when their inputs are generated by clocked CMOS circuits held in a steady state. Power sensitive data processors are typically manufactured from CMOS circuits.

The number of independently enabled/disabled clock regenerator circuits in the data processor may increase the overall power savings of the data processor. In the simplest case, all clock regenerators are commonly enabled or disabled. In other cases, different execution units within the data processor may be clocked independent of each other. These two strategies are appropriate in the case of certain complex instruction set computers ("CISC") and in the case of certain reduced instruction set computers ("RISC"), respectively.

The criteria by which clock regenerators are enabled or disabled is one disadvantage associated with the clock regenerator power savings strategy. This criteria is oftentimes not deterministic. For instance, in a multi-processor data processing system, each data processor may require that each other data processor perform some operation. These required operations are not known beforehand. Therefore, it is difficult for the data processor to determine if it may or may not turn itself off in certain situations. Prior solutions to this problem simply enable the relevant circuits at all times. These solutions avoid the deterministic criteria problem but does nothing to reduce power consumption.

SUMMARY OF THE INVENTION

In accordance with the present invention, there is disclosed a data processor having a cache which substantially eliminates disadvantages of known data processors.

A data processor for use in a data processing system supporting a data coherency protocol and snoop operations has a first cache coupled to an execution unit. The first cache has a first array circuitry coupled to a first clocking circuitry. The first array stores received data responsive to first control signals generated by the execution unit. The first clocking circuitry selectively enables and disables the operation of the array circuitry responsive to snoop operations. The execution unit supplies the received data to the first array.

A method of operating a data processor is also described having the steps of executing a load instruction in a data cache at a first time, disabling the operation of a portion of the data cache responsive to the absence of a snoop operation at a second time, and enabling the operation of the first array circuitry responsive to a snopp operation. The step of executing the load instruction further has the steps of generating first control signals and a first address in a first execution unit, forwarding the first address to a first array circuitry coupled to the execution unit, and forwarding the first address to a memory system coupled to and external to the data processor. The first array is a portion of the data cache. A first clocking circuitry coupled to the first array circuitry disables and enables the operation of the first array circuitry.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 1:
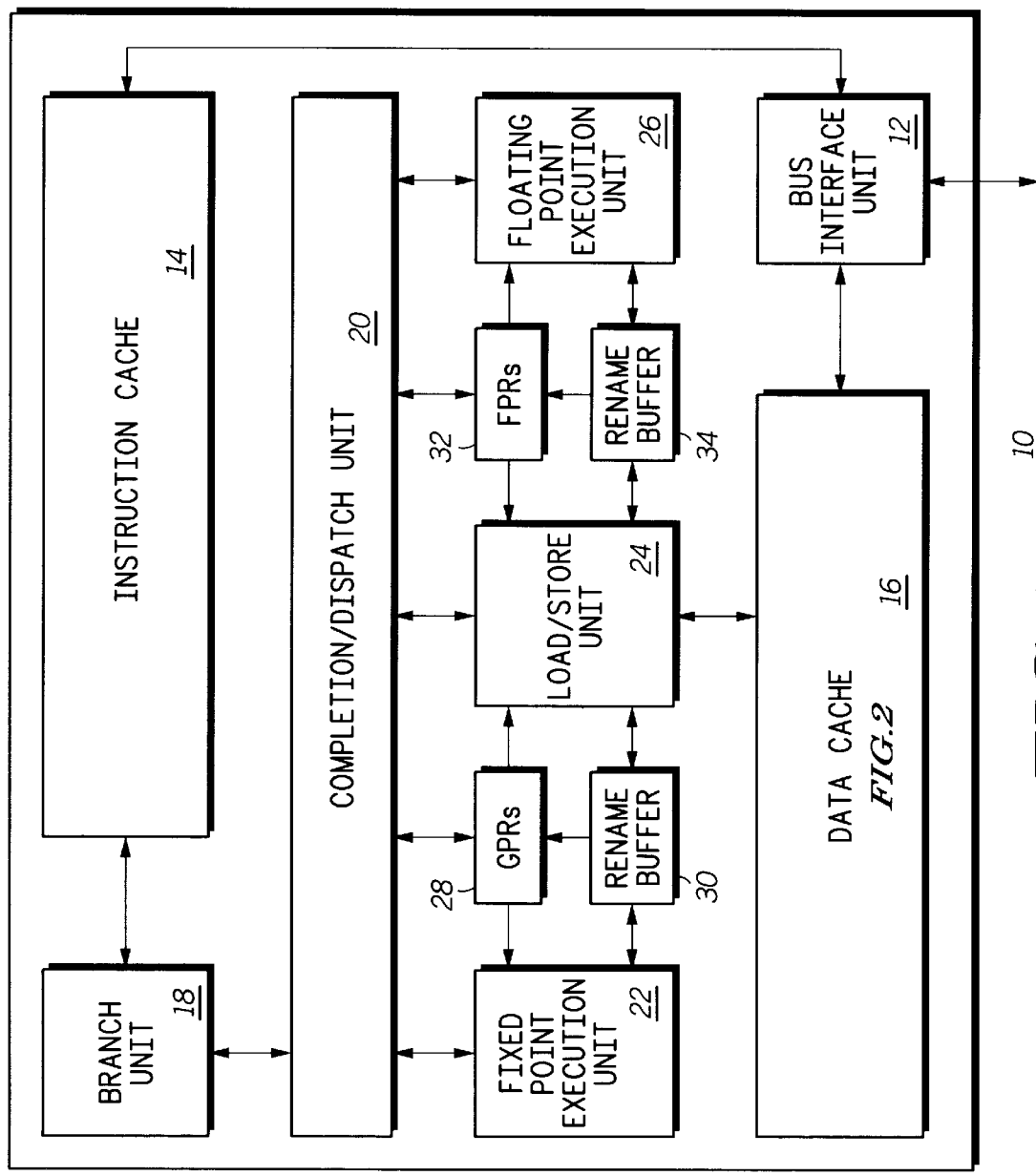
FIG. 1 depicts a block diagram of a data processor constructed in accordance with the present invention.

FIG. 1 depicts a block diagram of a data processor 10 constructed in accordance with the present invention. Data processor 10 is a data processor that reduces its power consumption by disabling its memory cache clock regenerators when the caches (instruction and data) are not operating. In particular, the caches are disabled after a "miss" while they wait for the missing data or instructions to be returned to them from the common memory system. The memory cache clock regenerators are enabled when they perform an operation or when they receive a "snoop" request from an associated device. The disclosed data processor is both compatible with low power environments and with sophisticated shared memory data processing systems.

Continuing with FIG. 1, a bus interface unit (hereafter BIU) 12 controls the flow of data between data processor 10 and the remainder of a data processing system (not depicted). BIU 12 is connected to an instruction cache 14 and to a data cache 16. Data cache 16 is more fully described below in connection with FIGS. 2 through 5. Instruction cache 14 supplies an instruction stream to a branch unit 18 and to a completion/dispatch unit 20. Completion/dispatch unit 20 forwards individual instructions to an appropriate execution unit. Data processor 10 has a fixed point execution unit 22, a load/store execution unit 24, and a floating point execution unit 26. Fixed point execution unit 22 and load/store execution unit 24 read and write their results to a general purpose architectural register file 28, (labeled GPRs and hereafter GPR file) and to a first rename buffer 30. Floating point execution unit 26 and load/store execution unit 24 read and write their results to a floating point architectural register file 32, (labeled FPRs and hereafter FPR file) and to a second rename buffer 34.

The operation of data processor 10 without the disclosed power saving features is known in the art. In general, branch unit 18 determines what sequence of programmed instructions is appropriate given the contents of certain data registers and the program steps themselves. Completion/dispatch unit 20 issues the individual instructions to the various execution units 22, 24 and 26. Each of the execution units performs one or more instructions of a particular class of instructions. The particular class of instructions of each execution unit is indicated by the name of the execution unit. For instance, floating point execution unit 26 executes floating point arithmetic instructions.

Fixed point execution unit 22 returns the results of its operations to designated entries in first rename buffer 30. First rename buffer 30 periodically updates an entry of GPR file 28 with an entry from first rename buffer 30 when all instructions preceding the instruction that generated the result have updated their GPR file entries. Completion/dispatch unit 20 coordinates this updating. Both first rename buffer 30 and GPR file 28 can supply operands to fixed point execution unit 22. Conversely, floating point execution unit 26 returns the results of its operations to designated entries in second rename buffer 34. Second rename buffer 34 periodically updates an entry of FPR file 32 with an entry in second rename buffer 34 when all instructions preceding the instruction that generated the result have updated their FPR file entries. Completion/dispatch unit 20 also coordinates this updating. Both second rename buffer 34 and FPR file 32 supply operands to floating point execution unit 26.

Load/store unit 24 reads data stored in GPR file 28, first rename buffer 30, FPR file 32 or second rename buffer 34 and writes the selected data to data cache 16. This data may also be written to an external memory system (not depicted) depending upon operating characteristics of data processor 10 not relevant to the disclosed invention. Conversely, load/store unit 24 reads data stored in data cache 16 and writes the read data to GPR file 28, first rename buffer 30, FPR file 32 or second rename buffer 34.

The operation of data processor 10 with the disclosed power saving feature is described below in connection with FIGS. 2 through 5. In general, data processor 10 may be incorporated into a sophisticated data processing system, such as a multi-processor data processing system ("MP"), that supports bus "snooping." In an MP system, each data processor in a group of dataprocessors stores a subset of the system's memory in an associated one of a group of memory caches. The data processors periodically load data from the system's main memory system into the associated memory cache and vice versa. Each data processor can modify the data in its memory cache independent of every other data processor. A memory coherency protocol ensures that the data stored in the common memory subsystem does not become hopelessly confused as each data processor modifies its subset of the memory.

A memory coherency protocol defines a set of data states and set of data operations that modify the data states in a predetermined order. Each memory byte, half-word, word, etc. is assigned a state and data describing the state accompanies the data whenever it is loaded into or out of a memory system. The data coherency protocol used in the depicted embodiment attributes one of three data states to every coherent memory location in a data processing system incorporating data processor 10: (1) modified exclusive ("M"), (2) unmodified exclusive ("E"), and (3) invalid ("I"). These three states, combined with a fourth state, shared ("S"), are known in the art as the "MESI" protocol (pronounced messy).

Each data processor classifies each of its operations that may effect the data coherency of data stored in one of its caches as a particular transaction type. Each data processor broadcasts the transaction type to every other device along with the address of the data when it intends to perform the associated operation on the identified data. Each data processor also broadcasts the address of data stored in common memory when the data processor intends to read the data from common memory as part of the read operation. This mechanism also serves to identify operations that effect data coherency to other devices. The depicted embodiment characterizes every operation as one of five transaction types: (1) clean, (2) flush, (3) kill, (4) read, or (5) write.

Each transaction type modifies the data state according to the preexisting data state of the identified data and to the data coherency protocol wherever the data is located in the data processing system. Therefore, each of the other data processors monitors these broadcasts for operations that involve data stored in each of the other data processors. This procedure is known as "snooping." The other data processors can then modify the data states of the identified data according to the preexisting data state of their data and to the data coherency protocol. In some situations, one of the other data processors may assert a signal temporarily suspending a broadcast operation of another data processor until the one data processor can write back its modified data to the MP system's memory.

Figure 2:
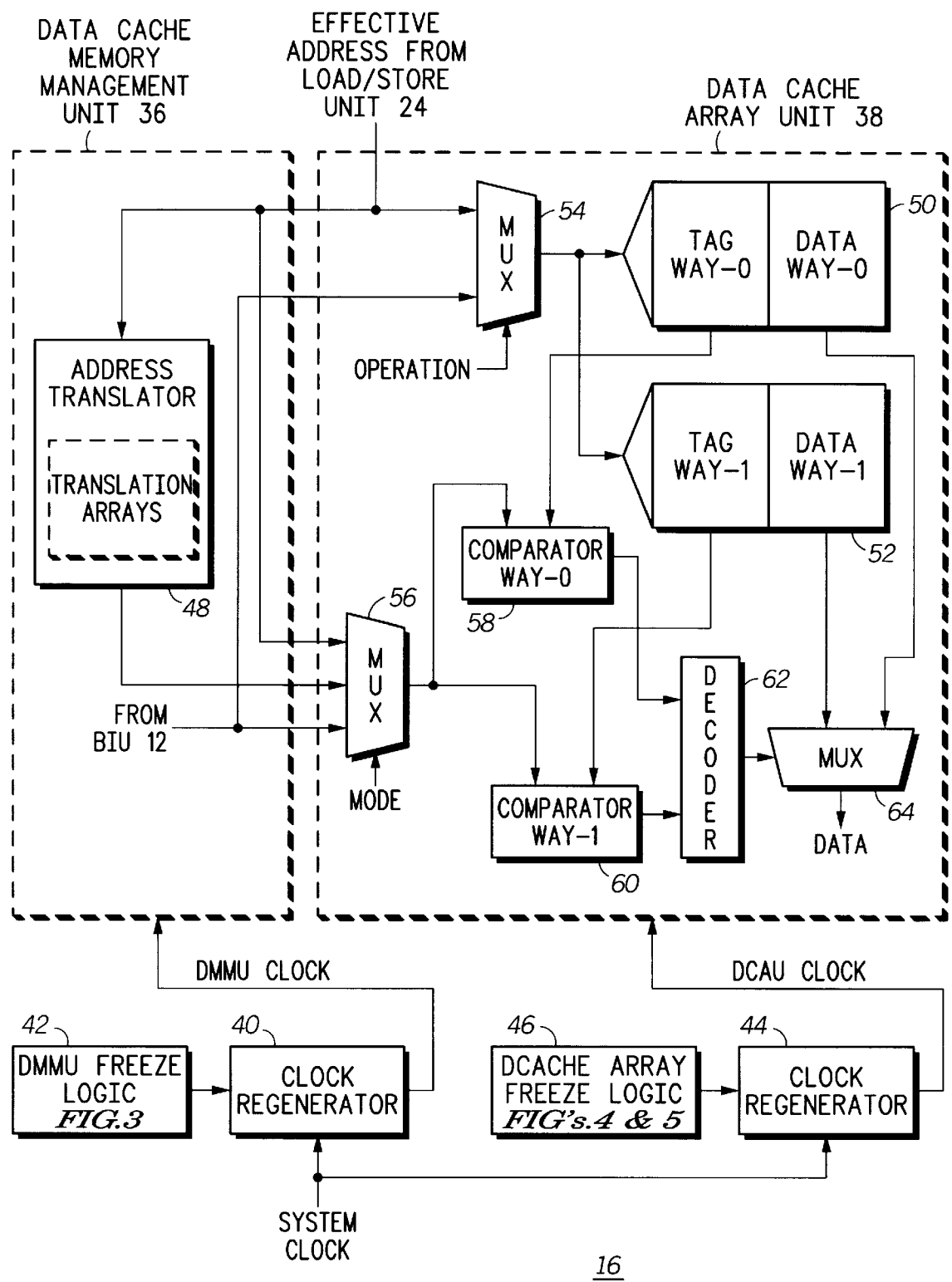
FIG. 2 depicts a block diagram of the data cache depicted in FIG. 1.

FIG. 2 depicts a block diagram of data cache 16 depicted in FIG. 1. Data cache 16 and instruction cache 14 are substantially similar. Therefore, the following discussion will focus on data cache 16, noting the differences from instruction cache 14 where appropriate. Data cache 16 is divided into two portions for purposes of power management: a data cache memory management unit 36 and a data cache array unit 38 (hereafter DCMMU and DCAU, respectively).

DCMMU 36 need only be enabled for operations originating from load/store unit 24. Operations originating from load/store unit 24 include load operations that "hit" in data cache 16, load operations that "miss" in data cache 16 and require data cache 16 to read or "fetch" data from an external memory device (not shown), store operations that "hit" in data cache 16 (old copy of the data already in data cache 16), and store operations that "miss" in data cache 16 (no copy of the data in data cache 16). Data cache 16 fetches the identified data in the case of a store-miss, merges it with the modified data from load/store unit 24, and stored it in data cache array unit 38. This procedure ensures data coherency.

DCAU 38 must be enabled for operations originating from load/store unit 24 and for snoop operations that originate from external devices (not shown). As described above, snoop operations originate from other devices, such as other data processors, input/output devices, etc., that share memory address space with data processor 10.

All clocked circuits in DCMMU 36 are connected to a clocking signal, DCMMU CLOCK, generated by a clock regenerator 40. It should be understood that more than one clock regenerator may be necessary to clock all circuits in DCMMU 36. However, each of these clock regenerators is identical to clock regenerator 40. Clock regenerator 40 receives a data processor-wide clock signal SYSTEM CLOCK and an enable signal. A DMMU freeze logic unit 42 generates the enable signal received by clock regenerator 40. Clock regenerator 40 outputs a clock signal equivalent to the SYSTEM CLOCK signal when DMMU freeze logic unit 42 asserts its enable signal. Clock regenerator 40 outputs a constant voltage when DMMU freeze logic unit 42 de-asserts its enable signal. The inputs to and the operation of DMMU freeze logic unit 42 are described below in connection with FIG. 3.

All clocked circuits in DCAU 38 a connected to a clocking signal, DCAU CLOCK, generated by a clock regenerator 44. It should be understood that more than one clock regenerator may be necessary to clock all circuits in DCAU 38. However, each of these clock regenerators is identical to clock regenerator 44. Clock regenerator 44 receives the data processor-wide clock signal SYSTEM CLOCK and an enable signal. A DCAU freeze logic unit 46 generates the enable signal received by clock regenerator 44. Clock regenerator 44 outputs a clock signal equivalent to the SYSTEM CLOCK signal (excluding signal skew) when DCAU freeze logic unit 46 asserts its enable signal. Clock regenerator 44 outputs a constant voltage when DCAU freeze logic unit 46 de-asserts its enable signal. The inputs to and the operation of DCAU freeze logic unit 46 are described below in connection with FIGS. 4 and 5.

Continuing with FIG. 2, DCMMU 36 has an address translator 48 that receives the most significant bits of an effective address from load/store unit 24. The received effective address identifies data that load/store unit 24 wants to either store to main memory or load from main memory. Address translator 48 contains one or more tables, or "translation arrays," that translate the received effective address into a physical address when combined with the least significant bits of the effective address. In the depicted embodiment, data within data cache 16 and instruction cache 14 is indexed according to the least significant bits of the physical address of the data. However, other portions of data processor 10 index data according to the effective address.

DCAU 38 has a first cache block 50 and a second cache block 52. First cache block 50 and second cache block 52 form a two-way set-associative cache. Each cache block stores a plurality of pairs of data and associated tags. One pair of data and tag are each indexed from first cache block 50 and from second cache block 52 for each address output by a first multiplexer 54.

First multiplexer 54 receives a subset of the effective address from load/store unit 24 described above and a subset of a physical address from BIU 12. The physical address supplied by BIU 12 identifies data which another device intends to read, write or otherwise manipulate: a "snooped" address. A control signal OPERATION selects which address first multiplexer 54 outputs. Circuitry (not shown) generates the control signal OPERATION responsive to whether data processor 10 is performing a load/store operation or is snooping some other device's data operation.

A second multiplexer 56 selects one of three addresses: the two addresses described above in connection with first multiplexer 54 and the effective address from load/store unit 24. A control signal MODE selects which address second multiplexer 56 outputs. Circuitry (not shown) generates the control signal MODE responsive to whether data processor 10 is performing a load/store operation or is snooping some other device's data operation. This circuitry also permits the effective address from load/store unit 24 to bypass address translator 48 responsive to a bit within a user programmable register.

A first comparator 58 compares a tag output from first cache block 50 and a subset of the physical address output by second multiplexer 56. A particular address output by first multiplexer 54 indexes the tag and a data block. First comparator 58 asserts a first hit signal if its two inputs are logically equivalent. A second comparator 60 compares a tag output from second cache block 52 and a subset of the physical address output by second multiplexer 56. Second comparator 60 asserts a second hit signal if its two inputs are logically equivalent. A 2-to-1 decoder 62 receives the hit signals generated by first comparator 58 and second comparator 60. Decoder 62 generates a single select signal coupled to a third multiplexer 64. Third multiplexer 64 receives a first data block output by first cache block 50 and a second data block output by second cache block 52. The first and second data blocks are indexed by the same particular address output by first multiplexer 54.

The operation of data cache 16 without DMMU freeze logic unit 42 and DCAU freeze logic unit 46 is known in the art. In general, load/store unit 24 reads data from (a "load" instruction) or writes data to (a "store" instruction) data cache 16 responsive to programmed instructions.

In the case of a load instruction, address translator 48 translates the effective address generated by load/store unit 24 into a physical address and compares the two corresponding tags to the translated address. One or none of the two tags may match the translated address depending on the prior history of data processor 10. If one of the tags does match, then the desired data is already in one of the cache blocks. In this case, the data block corresponding to the matching tag is output as DATA to load/store unit 24. If neither tag matches the translated address, then the data is not present in data cache 16. In this case, decoder 62 generates a signal(s) (not shown) that causes BIU 12 to request the data indexed by the translated address from main memory (not shown).

In the case of a store instruction, the memory model of data processor 10 defines whether each particular unit of data may be stored in data cache 16, "cacheable" data, or whether each unit of data may not be stored in data cache 16, "non-cacheable" data. Address translator 48 translates the effective address generated by load/store unit 24 into a physical address. If the particular unit of data is cacheable, then data cache 16 stores the data and the subset of the physical address into an entry of one of the two cache blocks. Data cache 16 will use a subset of the effective address to index into one of the two cache blocks. A later time, data cache 16 will copy back its previously stored data to the common memory system to ensure data coherency. If the particular unit of data is non-cacheable, then data cache 16 will store the data directly to the common memory system.

In the case of a snoop transaction, BIU 12 forwards the address of the snooped transaction to first multiplexer 54 and second multiplexer 56 from an external bus (not shown). Comparators 58 and 60 compare their two stored tags to the tag output by second multiplexer 56. Decoder 62 determines if the snooped data is present in either first memory block 50 or second memory block 52. If the snooped data is present, then circuitry (not shown) responds to the snoop transaction according to the data coherency protocol. For instance, the circuitry may invalidate the data stored in data cache 16 if another data processor indicates that it is about to modify an identical copy of the identified data. Or, the circuitry may delay a snooped load transaction by asserting another bus control signal if data cache 16 contains a modified copy of the snooped data. In this second case, data processor 10 will write its data to the common memory so that the second data processor will read the current version of the data. This final step is known as a "copy back" or "castout" operation.

Figure 3:
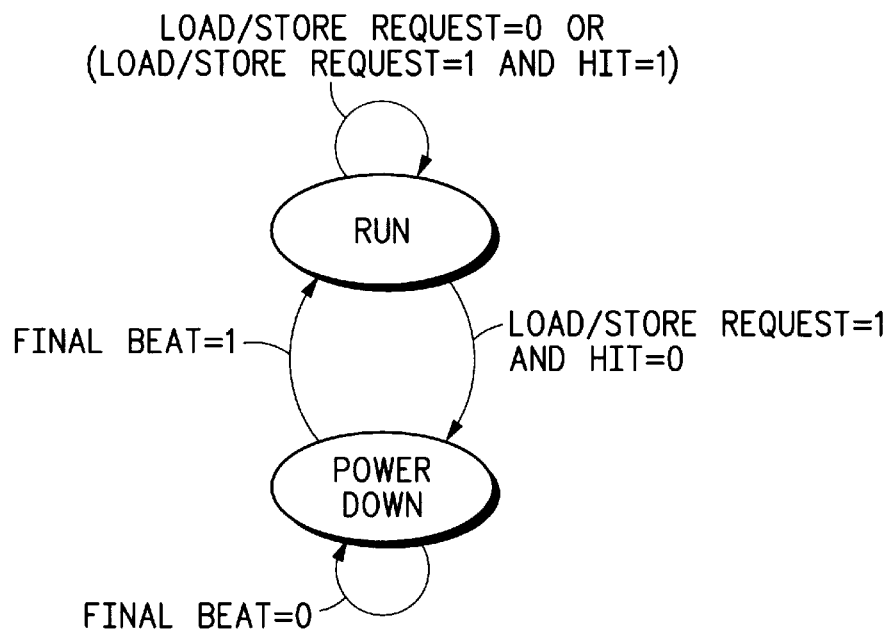
FIG. 3 depicts a state-transition diagram of a DMMU freeze logic unit depicted in FIG. 2.

FIG. 3 depicts a state-transition diagram of DMMU freeze logic unit 42 depicted in FIG. 2. This state-transition diagram illustrates how DMMU freeze logic unit 42 monitors certain load/store activities. DMMU freeze logic unit 42 may power down DCMMU 36 during certain portions of these activities. DMMU freeze logic unit 42 receives the control signal inputs HIT from decoder 62, FINAL BEAT from BIU 12, and LOAD/STORE REQUEST from load/store unit 24. These inputs control what logic state DMMU freeze logic unit 42 is in.

When asserted, the control signal HIT indicates that an indexed piece of data is resident in either first cache block 50 or second cache block 52. When de-asserted, the control signal HIT indicates that an indexed piece of data is resident in neither first cache block 50 or second cache block 52.

When asserted, the control signal FINAL BEAT indicates that the last block of a data of a transaction that comprises several blocks of data is available. When de-asserted, the control signal FINAL BEAT indicates that the last data block is not available or a that a multi-beat transaction is not occurring.

When asserted, the control signal LOAD/STORE REQUEST indicates that load/store unit 24 is either executing a load or a store instruction. When de-asserted, the control signal LOAD/STORE REQUEST indicates that load/store unit 24 does not request any data from data cache 16.

DMMU freeze logic unit 42 may be in one of two logic states: run or power down. DMMU freeze logic unit 42 remains in the run logic state if (1) the control signal LOAD/STORE REQUEST is de-asserted or if (2) LOAD/STORE REQUEST is asserted and HIT is asserted. DMMU freeze logic unit 42 transitions from the run logic state to the power down logic state if the control signal LOAD/STORE REQUEST is asserted and the control signal HIT is de-asserted. DMMU freeze logic unit 42 remains in the power down logic state if the control signal FINAL BEAT is de-asserted. DMMU freeze logic unit 42 transitions from the power down logic state to the run logic state if the control signal FINAL BEAT is asserted. DMMU freeze logic unit 42 asserts its enable signal while in the run state. DMMU freeze logic unit 42 de-asserts its enable signal while in the power down logic state.

DCAU freeze logic 46 receives the control signal inputs HIT from decoder 62, FINAL BEAT, DATA BEAT and SNOOP REQUEST from BIU 12, LOAD/STORE REQUEST from load/store unit 24, and SBR/$\overline{\text{BURST-READ}}$. CASTOUT, CASTOUT DONE, SNOOP CASTOUT, and SNOOP CASTOUT DONE. From these inputs, DCAU freeze logic 46 operates two state machines simultaneously. These state machines are described below in connection with FIGS. 4 and 5. Combined, these state machines define when DCAU freeze logic 46 disables clock regenerator 44. The equivalent circuit in instruction cache 14 does not have to support snooping operations. Therefore, the equivalent circuit in instruction cache 14 does not execute the state diagram depicted in FIG. 5. In addition, the equivalent circuit in instruction cache 14 does not execute all of the state diagram depicted in FIG. 4.

The control signals HIT, FINAL BEAT and LOAD/STORE REQUEST are described above in connection with FIG. 3.

When asserted, the control signal DATA BEAT indicates that a block of data is available from the common memory system, typically on a shared data bus (not shown). When de-asserted, the control signal DATA BEAT indicates that no data is available from the common memory system.

When asserted, the control signal SBR/$\overline{\text{BURST-READ}}$ indicates that a particular load transaction will return a unit of data from memory having no more bits than the bit width of the shared data bus. When de-asserted, the control signal SBR/$\overline{\text{BURST-READ}}$ indicates that a particular load transaction will return four units of data from memory having the width of the associated data bus. Although a single beat read transaction and a burst read transaction (when SBR/$\overline{\text{BURST-READ}}$ asserted and de-asserted, respectively) may take only one and four cycles to transfer data, respectively, there are typically opportunities for data cache 16 to power down. For instance, there is an initial memory access time required for the external memory system to return the first data unit in both single beat and burst read transactions. Also, there are typically pauses between individual data unit transfers for burst data read transactions. During these times, data cache 16 may be turned off to conserve power.

When asserted, the control signal CASTOUT indicates that data cache 16 must first write modified data back to the common memory system to make room for the requested data within data cache 16. When de-asserted, the control signal CASTOUT indicates that there is room in data cache 16 for the requested data.

When asserted, the control signal CASTOUT DONE indicates that data cache 16 has written modified data back to memory to make room for requested data. When de-asserted, the control signal CASTOUT DONE indicates that data cache 16 has not finished writing its modified data back to the common memory system or is not performing a castout operation.

When asserted, the control signal SNOOP REQUEST indicates that an external device intends to read, write or otherwise modify data that may be stored in data cache 16. Therefore, data cache 16 must determine if it contains the data and execute whatever action is dictated by the data coherency protocol. When de-asserted, the control signal SNOOP REQUEST indicates that there is no snoop activity.

When asserted, the control signal SNOOP CASTOUT indicates that data cache 16 must first write modified data back to memory or "push out" data to the common memory system (not shown) due to a snoop. When de-asserted, the control signal SNOOP CASTOUT indicates that no data push is required.

When asserted, the control signal SNOOP CASTOUT DONE indicates that data cache 16 has completed pushing modified data back to the common memory system. When de-asserted, the control signal SNOOP CASTOUT DONE indicates that data cache 16 has not yet completed its data push or is not performing a snoop castout.

Figure 4:
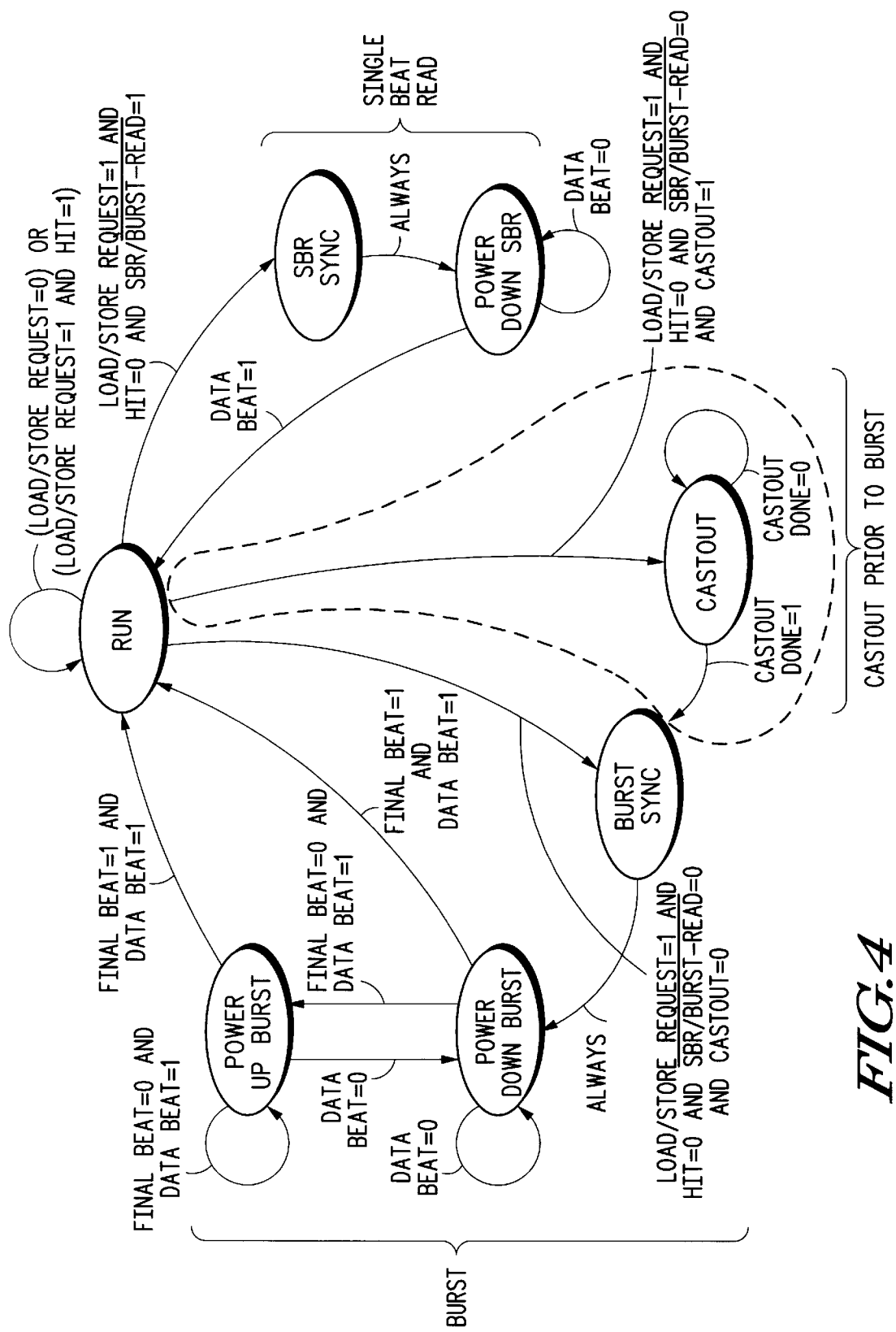
FIG. 4 depicts a first state-transition diagram of a data cache array freeze logic unit depicted in FIG. 2.

FIG. 4 depicts a first state-transition diagram of DCAU freeze logic unit 46 depicted in FIG. 2. This first state-transition diagram illustrates how DCAU freeze logic unit 46 monitors certain load/store activities. DCAU freeze logic unit 46 may power down DCAU 38 during certain portions of these activities. In particular, these monitored load/store operations may be classified as single beat read operations or burst read operations. Single beat read transactions appear in the right-hand portion of the FIG. and burst read transactions appear in the left-hand portion of the FIG. A run state is the reset state for the first state machine in DCAU freeze logic unit 46. DCAU freeze logic unit 46 remains in the run state if (1) the control signal LOAD/STORE REQUEST is de-asserted or if (2) both LOAD/STORE REQUEST and HIT are asserted.

In a single beat read transaction, DCAU freeze logic unit 46 transitions from the run logic state to a single beat sync state (labeled SBR SYNC) if LOAD/STORE REQUEST is asserted, if the control signal HIT is de-asserted and if the control signal SBR/BURST-READ is asserted. DCAU freeze logic unit 46 remains in the SBR sync state for one cycle and then transitions to a power down single beat read state (labeled POWER DOWN SBR). DCAU freeze logic unit 46 remains in the power down single beat read state while DATA BEAT is de-asserted. DCAU freeze logic unit 46 transitions from the power down single beat read state back to the run state if DATA BEAT is asserted. (Single beat read instructions are not stored in data cache 16 in the depicted embodiment. This data is either loaded into a general purpose register from common memory or stored from a general purpose register, directly. Therefore, castout operations, described below, are not necessary prior to this type of operation.)

In a burst read transaction, DCAU freeze logic unit 46 transitions from the run state to either a castout state, if a castout operation is required, or, if no castout operation is required, then to a burst sync state. Data stored in instruction cache 14 are not modified. Therefore, the power management circuitry in instruction cache 14 does not implement that portion of FIG. 4 enclosed by the dashed line.

DCAU freeze logic unit 46 transitions to the castout state if LOAD/STORE REQUEST is asserted, if HIT is de-asserted, if SBR/BURST-READ is de-asserted, and if CASTOUT is asserted. DCAU freeze logic unit 46 remains in the castout state while CASTOUT DONE is de-asserted. DCAU freeze logic unit 46 transitions from the castout state to the burst sync state if the control signal CASTOUT DONE is asserted. DCAU freeze logic unit 46 transitions directly to the burst sync state from the run state if LOAD/STORE REQUEST is asserted, if HIT is de-asserted, if SBR/BURST-READ is de-asserted, and if CASTOUT is de-asserted. DCAU freeze logic unit 46 remains in the burst sync for one cycle and then transitions to a power down burst state. DCAU freeze logic unit 46 remains in the power down burst state while the control signal DATA BEAT is de-asserted. DCAU freeze logic unit 46 transitions from the power down burst state back to the run state if DATA BEAT is asserted and if FINAL BEAT is asserted. DCAU freeze logic unit 46 transitions from the power down burst state to a power up burst state if DATA BEAT is asserted and if FINAL BEAT is de-asserted. DCAU freeze logic unit 46 remains in the power up burst state while DATA BEAT is asserted and FINAL BEAT is de-asserted. DCAU freeze logic unit 46 transitions from the power up burst state back to the power down burst state if DATA BEAT is de-asserted. DCAU freeze logic unit 46 transitions from the power up burst state back to the run state if DATA BEAT is asserted and FINAL BEAT is asserted.

Figure 5:
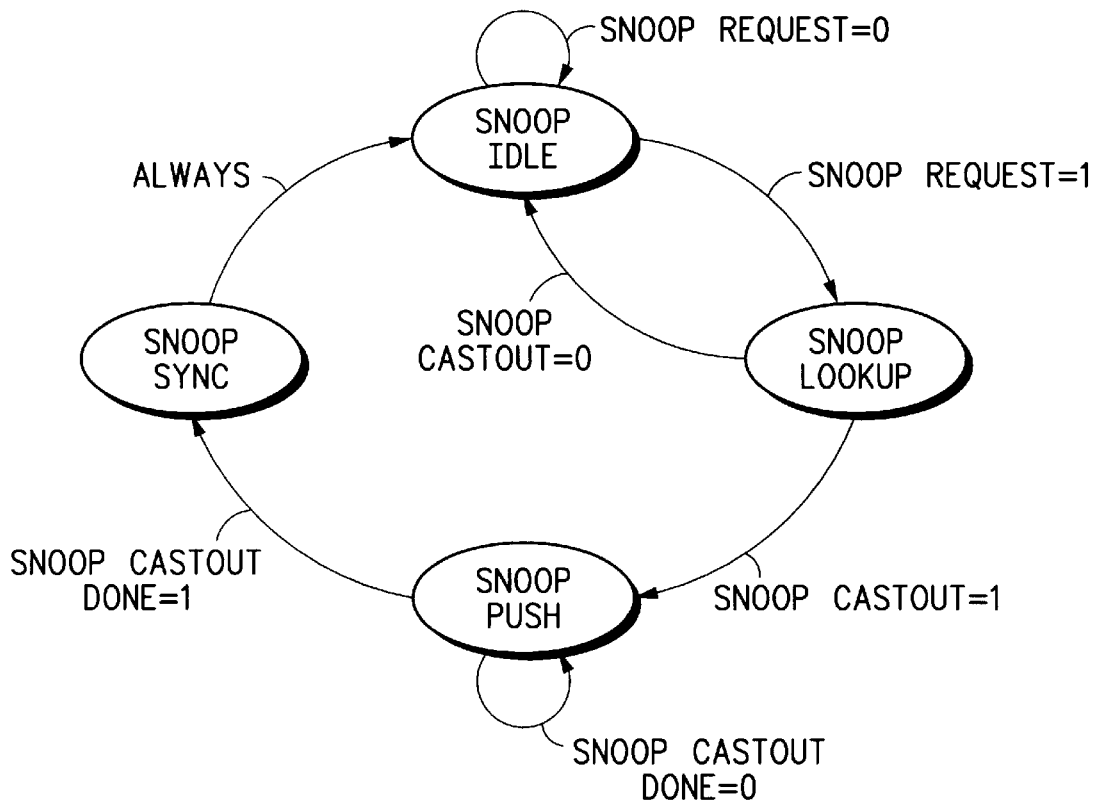
FIG. 5 depicts a second state-transition diagram of a data cache array freeze logic unit depicted in FIG. 2.

FIG. 5 depicts a second state-transition diagram of a DCAU freeze logic unit 46 depicted in FIG. 2. This second state-transition diagram illustrates how DCAU freeze logic unit 46 monitors snoop activity generated from external devices, such as other data processors.

When asserted, the control signal SNOOP REQUEST indicates that an external device intends to read, write or otherwise modify data that may be stored in data cache 16. Therefore, data cache 16 must determine if it contains the data and execute whatever action is dictated by the data coherency protocol. When de-asserted, the control signal SNOOP REQUEST indicates that there is no snoop activity. When asserted, the control signal SNOOP CASTOUT indicates that data cache 16 must first write modified data back to memory or "push out" data to the common memory system (not shown) due to a snoop. When de-asserted, the control signal SNOOP CASTOUT indicates that no data push is required. When asserted, the control signal SNOOP CASTOUT DONE indicates that data cache 16 has completed pushing modified data back to the common memory system.

The reset state is labeled snoop idle. DCAU freeze logic unit 46 remains in the snoop idle state while SNOOP REQUEST is de-asserted. DCAU freeze logic unit 46 transitions from the snoop idle state to a snoop lookup state if SNOOP REQUEST is asserted. DCAU freeze logic unit 46 transitions back to the snoop idle state if SNOOP CASTOUT is de-asserted. DCAU freeze logic unit 46 transitions from the snoop lookup state to a snoop push state if SNOOP CASTOUT is asserted. DCAU freeze logic unit 46 remains in the snoop push state while SNOOP CASTOUT DONE is de-asserted. DCAU freeze logic unit 46 transitions from the snoop push state to a snoop sync state if SNOOP CASTOUT DONE is asserted. DCAU freeze logic unit 46 transitions back to the snoop idle state during the following machine cycle.

DCAU freeze logic unit 46 de-asserts its enable signal (powers down DCAU 38) when the following two conditions are fulfilled: (1) a) DCAU freeze logic unit 46 is in the power down SBR state and DATA BEAT is de-asserted; or b) DCAU freeze logic unit 46 is in the power down burst state and DATA BEAT is de-asserted; and (2) DCAU freeze logic unit 46 is in the snoop idle state and SNOOP REQUEST is de-asserted. As described above, there is an equivalent instruction cache array freeze logic unit that powers down the instruction cache array (neither shown). This freeze logic unit de-asserts its enable signal (powers down an instructions cache array unit) when one of the following two conditions is fulfilled: (1) it is in the power down SBR state and DATA BEAT is de-asserted; or (2) it is in the power down burst state and DATA BEAT is de-asserted.

Although the present invention has been described with reference to a specific embodiment, further modifications and improvements will occur to those skilled in the art. For instance, the disclosed invention may be incorporated into data processors traditionally classified as complex instruction set computers or CISC machines. Also, certain functional units may be omitted in certain embodiments or relocated to other areas of data processor 10. It is to be understood therefore, that the invention encompasses all such modifications that do not depart from the spirit and scope of the invention as defined in the appended claims.

What is claimed is:

1. A method of operating a data processor for use in a data processing system supporting a data coherency protocol and snoop operations, the snoop operations causing a comparison of a received address with at least one of a plurality of tags, the method comprising the steps of:

at a first time period, executing a load instruction comprising the steps of:
generating first control signals and a first address in a first execution unit of a data processor;

forwarding the first address to a memory cache coupled to the execution unit of the data processor, the memory cache storing data and a plurality of tags, the data a subset of data stored in a memory system coupled to and external to the data processor, a differing one of the plurality of tags representative of a location in the memory system of a differing one of the data;

forwarding the first address to the memory system;

at a second time period subsequent to the first time period, disabling the operation of the memory cache by a first clocking circuitry coupled to the memory cache responsive to a snoop signal indicating an absence of a snoop operation from a device external to the data processor;

at a third time period subsequent to the second time period,
receiving a snoop operation from a second data processor coupled to the memory system;
enabling the operation of the memory cache by the first clocking circuitry; and
maintaining coherency between the data stored in the memory cache and the data stored in the memory system.

2. The method of claim 1 further comprising the steps of:
at a fourth time period subsequent to the first period and prior to the second period, receiving a unit of data from the memory system in the data processor; and
storing the data in the memory cache.

3. The method of claim 1 further comprising the steps of:
at a fourth time period subsequent to the second period and prior to the third period, receiving a unit of data from the memory system in the data processor; and
storing the data in the memory cache.

4. A data processing device comprising:
a load/store module having a load/store output signal;
a data cache responsive to the load/store module, the data cache including a data cache management unit and a data cache array unit, the data cache array unit including a plurality of tagged cache data blocks and including a decoder to produce a first control signal;
a memory bus interface unit coupled to the data cache, the memory bus interface unit providing a second control signal; and
first clock control logic operatively coupled to disable the data cache management unit based on the load/store output signal, the first control signal, and the second control signal.

5. The data processing device of claim 4, wherein the first clock control logic disables the data cache management unit in response to the load/store output signal indicating the load/store module is executing an instruction and the first control signal from the decoder indicates that no indexed data is resident in any of the plurality of tagged cache data blocks within the data cache array unit.

6. The data processing device of claim 5, wherein the first clock control logic enables the data cache management unit when the second control signal indicates that the last data block of a multi data block instruction is available for processing.

7. The data processing device of claim 4, further comprising second clock control logic operatively coupled to selectively disable the data cache array unit based on the load/store output signal, the first control signal, and the second control signal.

8. The data processing device of claim 4, wherein the second clock control logic disables the data cache array unit during a single beat read transaction.

9. The data processing device of claim 8, wherein the second clock control logic disables the data cache array unit after detecting the load/store output signal indicates the load/store module is executing an instruction, the first control signal from the decoder indicates that no indexed data is resident in any of the plurality of tagged cache data blocks within the data cache array unit, and the instruction is a load transaction that will return a unit of data from a memory having no more bits than a bit width of a shared data bus to the memory, the shared data bus responsive to the bus interface unit.

10. The data processing device of claim 4, wherein the second clock control logic disables the data cache array unit during a burst read transaction.

11. The data processing device of claim 10, wherein the second clock control logic disables the data cache array unit in response to a control signal that indicates that a block of data is available from a common memory system in communication with the cache and after the second control signal indicates that the last data block of a multi data block instruction is available for processing.

12. The data processing device of claim 4, wherein the second clock control logic disables the data cache array unit in response to a snoop action generated from an external processor.

13. The data processing device of claim 12, wherein the second clock control logic disables the data cache array when the second control logic is in a single beat read state, a data beat signal is de-asserted and a snoop signal indicates that no external device intends to access the data cache memory.

14. The data processing device of claim 12, wherein the second clock control logic disables the data cache array based on a snoop signal that indicates that no external device is to access the data cache memory.

* * * * *